United States Patent
Conklin

(10) Patent No.: US 10,250,885 B2
(45) Date of Patent: *Apr. 2, 2019

(54) SYSTEM AND METHOD FOR INTRACODING VIDEO DATA

(71) Applicant: Intel Corporation, Santa Clara, CA (US)

(72) Inventor: Gregory J. Conklin, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,235

(22) Filed: Mar. 20, 2018

(65) Prior Publication Data

US 2018/0278941 A1    Sep. 27, 2018

Related U.S. Application Data

(60) Continuation of application No. 15/245,975, filed on Aug. 24, 2016, now Pat. No. 9,930,343, which is a
(Continued)

(51) Int. Cl.
*H04N 7/12* (2006.01)
*H04N 19/159* (2014.01)
(Continued)

(52) U.S. Cl.
CPC ......... *H04N 19/159* (2014.11); *H04N 19/172* (2014.11); *H04N 19/176* (2014.11);
(Continued)

(58) Field of Classification Search
CPC .. H04N 19/159; H04N 19/172; H04N 19/182; H04N 19/50
(Continued)

(56) References Cited

U.S. PATENT DOCUMENTS

| | | | |
|---|---|---|---|
| 4,383,272 | A | 5/1983 | Netravali et al. |
| 4,466,714 | A | 8/1984 | Dyfverman |

(Continued)

FOREIGN PATENT DOCUMENTS

| | | |
|---|---|---|
| CN | 1450809 | 10/2003 |
| CN | 1961582 | 5/2007 |

(Continued)

OTHER PUBLICATIONS

Combined Search and Examination Report received for GB Patent Application No. GB1100658.2, dated May 16, 2011.
(Continued)

*Primary Examiner* — Gims S Philippe
(74) *Attorney, Agent, or Firm* — Green, Howard & Mughal LLP

(57) ABSTRACT

A video system for coding a stream of video data that includes a stream of video frames divides each video frame into a matrix of a plurality of subblocks, wherein each subblock includes a plurality of pixels. The video system operates in accordance with nine prediction modes. Each prediction mode determines a prediction mode according to which a present subblock is to be coded. One of the nine prediction modes is selected to encode the present subblock, wherein the selected prediction mode provides for a minimum error value in the present subblock.

20 Claims, 5 Drawing Sheets

Related U.S. Application Data continuation of application No. 14/140,349, filed on Dec. 24, 2013, now Pat. No. 9,432,682, which is a division of application No. 13/679,957, filed on Nov. 16, 2012, now Pat. No. 8,908,764, which is a continuation of application No. 12/767,744, filed on Apr. 26, 2010, now Pat. No. 8,385,415, which is a continuation of application No. 10/848,992, filed on May 18, 2004, now Pat. No. 7,706,444, which is a continuation of application No. 09/732,522, filed on Dec. 6, 2000, now Pat. No. 6,765,964.

(51) Int. Cl.
  *H04N 19/50* (2014.01)
  *H04N 19/593* (2014.01)
  *H04N 19/513* (2014.01)
  *H04N 19/172* (2014.01)
  *H04N 19/176* (2014.01)
  *H04N 19/182* (2014.01)

(52) U.S. Cl.
  CPC ........... *H04N 19/182* (2014.11); *H04N 19/50* (2014.11); *H04N 19/513* (2014.11); *H04N 19/593* (2014.11)

(58) Field of Classification Search
  USPC ........................................ 375/240.01–240.29
  See application file for complete search history.

(56) References Cited

U.S. PATENT DOCUMENTS

| | | |
|---|---|---|
| 4,862,259 A | 8/1989 | Gillard |
| 4,862,260 A | 8/1989 | Harradine et al. |
| 4,864,393 A | 9/1989 | Harradine et al. |
| 4,864,398 A | 9/1989 | Avis et al. |
| 4,865,394 A | 9/1989 | Gillard |
| 4,967,271 A | 10/1990 | Campbell et al. |
| 5,020,121 A * | 5/1991 | Rosenberg .............. G06T 9/004 358/1.9 |
| 5,313,281 A | 5/1994 | Richards |
| 5,398,068 A | 3/1995 | Liu et al. |
| 5,410,358 A | 4/1995 | Shackleton et al. |
| 5,467,086 A | 11/1995 | Jeong |
| 5,546,477 A | 8/1996 | Knowles et al. |
| 5,568,200 A | 10/1996 | Pearlstein et al. |
| 5,592,226 A | 1/1997 | Lee et al. |
| 5,615,287 A | 3/1997 | Fu et al. |
| 5,642,239 A | 6/1997 | Nagai |
| 5,677,735 A | 10/1997 | ueno et al. |
| 5,699,499 A | 12/1997 | Kawada et al. |
| 5,734,435 A | 3/1998 | Wilson et al. |
| 5,742,343 A | 4/1998 | Haskell et al. |
| 5,748,248 A | 5/1998 | Parke |
| 5,786,864 A | 7/1998 | Yamamoto |
| 5,831,677 A | 11/1998 | Streater |
| 5,838,828 A | 11/1998 | Mizuki et al. |
| 5,943,090 A | 8/1999 | Eiberger et al. |
| 5,974,177 A | 10/1999 | Krtolica |
| 5,995,154 A | 11/1999 | Heimburger |
| 5,999,173 A | 12/1999 | Ubillos |
| 6,014,473 A | 1/2000 | Hossack et al. |
| 6,058,142 A | 5/2000 | Ishikawa et al. |
| 6,061,474 A * | 5/2000 | Kajiwara ............... H04N 19/50 375/240.14 |
| 6,067,321 A | 5/2000 | Lempel |
| 6,072,833 A | 6/2000 | Yamauchi |
| 6,084,908 A | 7/2000 | Chiang et al. |
| 6,125,144 A | 9/2000 | Matsumura et al. |
| 6,130,912 A | 10/2000 | Chang et al. |
| 6,141,449 A | 10/2000 | Kawada et al. |
| 6,148,109 A | 11/2000 | Boon |
| 6,157,396 A | 12/2000 | Margulis et al. |
| 6,181,382 B1 | 1/2001 | Kieu et al. |
| 6,185,329 B1 | 2/2001 | Zhang et al. |
| 6,208,760 B1 | 3/2001 | De Haan et al. |
| 6,222,885 B1 | 4/2001 | Chaddha et al. |
| 6,256,068 B1 | 7/2001 | Takada et al. |
| 6,408,096 B2 | 6/2002 | Tan |
| 6,421,386 B1 | 7/2002 | Chung et al. |
| 6,519,005 B2 | 2/2003 | Bakhmutsky et al. |
| 6,556,197 B1 | 4/2003 | Van Hook et al. |
| 6,556,718 B1 | 4/2003 | Piccinelli et al. |
| 1,450,809 A1 | 10/2003 | Lee |
| 6,654,420 B1 | 11/2003 | Snook |
| 6,690,728 B1 | 2/2004 | Chang et al. |
| 6,707,367 B2 | 3/2004 | Castaneda et al. |
| 6,765,964 B1 | 7/2004 | Conklin |
| 7,010,279 B2 | 3/2006 | Rofougaran |
| 7,023,921 B2 | 4/2006 | Subramaniyan et al. |
| 7,133,451 B2 | 11/2006 | Kim et al. |
| 7,248,844 B2 | 7/2007 | Rofougaran |
| 7,259,649 B2 | 8/2007 | Ancey et al. |
| 7,260,148 B2 | 8/2007 | Sohm |
| 7,289,672 B2 | 10/2007 | Sun et al. |
| 7,463,687 B2 | 12/2008 | Subramaniyan et al. |
| 7,526,256 B2 | 4/2009 | Bhatti et al. |
| 7,590,180 B2 | 9/2009 | Kang |
| 7,683,851 B2 | 3/2010 | Rofougaran et al. |
| 7,751,482 B1 | 7/2010 | Srinivasan et al. |
| 7,764,740 B2 | 7/2010 | Seok et al. |
| 7,890,066 B2 | 2/2011 | Rofougaran et al. |
| 8,107,748 B2 | 1/2012 | Miao et al. |
| 8,233,538 B2 | 7/2012 | Sun et al. |
| 8,238,421 B2 | 8/2012 | Choi et al. |
| 8,279,018 B1 | 10/2012 | Song et al. |
| 8,279,927 B2 | 10/2012 | Sun et al. |
| 8,295,551 B2 | 10/2012 | Lertrattanapanich et al. |
| 8,331,450 B2 | 12/2012 | Sun et al. |
| 8,462,852 B2 | 6/2013 | Xu et al. |
| 2002/0175320 A1 | 11/2002 | Heun et al. |
| 2002/0176500 A1 | 11/2002 | Bakhmutsky et al. |
| 2003/0031128 A1 | 2/2003 | Kim et al. |
| 2003/0063671 A1 | 4/2003 | Song |
| 2003/0189981 A1 | 10/2003 | Lee |
| 2004/0046891 A1 | 3/2004 | Mishima et al. |
| 2004/0114688 A1 | 6/2004 | Kang |
| 2005/0018772 A1 | 1/2005 | Sung et al. |
| 2005/0135481 A1 | 6/2005 | Sung et al. |
| 2005/0220190 A1 | 10/2005 | Ha et al. |
| 2005/0259736 A1 | 11/2005 | Payson |
| 2005/0286777 A1 | 12/2005 | Kumar et al. |
| 2006/0018383 A1 | 1/2006 | Shi et al. |
| 2006/0109905 A1 | 5/2006 | Seok et al. |
| 2006/0215761 A1 | 9/2006 | Shi et al. |
| 2007/0053440 A1 | 3/2007 | Hsieh et al. |
| 2007/0064803 A1 | 3/2007 | Miao et al. |
| 2007/0064804 A1 | 3/2007 | Paniconi et al. |
| 2007/0086526 A1 | 4/2007 | Koto et al. |
| 2007/0239546 A1 | 10/2007 | Blum et al. |
| 2007/0268964 A1 | 11/2007 | Zhao |
| 2007/0297510 A1 | 12/2007 | Herpel et al. |
| 2008/0069230 A1 | 3/2008 | Kondo |
| 2008/0101707 A1 | 5/2008 | Mukherjee et al. |
| 2008/0175320 A1 | 7/2008 | Sun et al. |
| 2008/0181309 A1 | 7/2008 | Lee et al. |
| 2008/0214146 A1 | 9/2008 | Lincoln et al. |
| 2008/0253457 A1 | 10/2008 | Moore |
| 2008/0281685 A1 | 11/2008 | Jaffe et al. |
| 2009/0060359 A1 | 3/2009 | Kim et al. |
| 2009/0304084 A1 | 3/2009 | Hallapuro |
| 2009/0172751 A1 | 7/2009 | Aldrey et al. |
| 2009/0207915 A1 | 8/2009 | Yan et al. |
| 2010/0046614 A1 | 2/2010 | Choi et al. |
| 2010/0109798 A1 | 5/2010 | Chu |
| 2010/0201457 A1 | 8/2010 | Lee et al. |
| 2011/0002387 A1 | 1/2011 | Chiu et al. |
| 2011/0002389 A1 | 1/2011 | Xu et al. |
| 2011/0090964 A1 | 4/2011 | Lidong et al. |
| 2011/0261882 A1 | 10/2011 | Zheng et al. |
| 2011/0286523 A1 | 11/2011 | Dencher |
| 2012/0294370 A1 | 11/2012 | Chiu et al. |

(56) References Cited

U.S. PATENT DOCUMENTS

| | | |
|---|---|---|
| 2013/0064296 A1 | 3/2013 | Sun et al. |
| 2013/0082810 A1 | 4/2013 | Feng et al. |
| 2013/0287111 A1 | 10/2013 | Xu et al. |
| 2013/0336402 A1 | 12/2013 | Xu et al. |

FOREIGN PATENT DOCUMENTS

| | | |
|---|---|---|
| CN | 1977539 | 6/2007 |
| CN | 101001377 | 7/2007 |
| CN | 101023673 | 8/2007 |
| CN | 101378504 | 3/2009 |
| CN | 101621696 | 1/2010 |
| CN | 101647285 | 2/2010 |
| CN | 101945276 | 1/2011 |
| CN | 102045563 | 5/2011 |
| CN | 102340664 | 2/2012 |
| DE | 102010025816 | 1/2011 |
| DE | 102010046508 | 6/2011 |
| DE | 102011008630 | 9/2011 |
| EP | 0391094 | 12/1990 |
| EP | 0596732 | 11/1993 |
| EP | 0634871 | 7/1994 |
| EP | 0781041 | 6/1997 |
| EP | 0883298 | 6/1998 |
| EP | 0294957 | 12/1998 |
| EP | 1903798 | 3/2008 |
| EP | 1932366 | 6/2008 |
| EP | 1981281 | 10/2008 |
| GB | 2471577 | 1/2011 |
| GB | 2477033 | 4/2012 |
| JP | 10023420 | 1/1998 |
| JP | 10336666 | 12/1998 |
| JP | 11205799 | 7/1999 |
| JP | 2000350211 | 12/2000 |
| JP | 2003169338 | 6/2003 |
| JP | 2003319400 | 11/2003 |
| JP | 2004048512 | 2/2004 |
| JP | 2004328633 | 11/2004 |
| JP | 2004343349 | 12/2004 |
| JP | 2005094458 | 4/2005 |
| JP | 2005269164 | 9/2005 |
| JP | 2006033433 | 2/2006 |
| JP | 2009044350 | 2/2009 |
| JP | 4352189 | 10/2009 |
| JP | 2011029863 | 2/2011 |
| KR | 20090069461 | 7/2009 |
| KR | 1020110003438 | 1/2011 |
| TW | 201127068 | 8/2011 |
| TW | 201204054 | 1/2012 |
| WO | 9746020 | 12/1997 |
| WO | 9925122 | 5/1999 |
| WO | 9952281 | 10/1999 |
| WO | 2007035276 | 3/2007 |
| WO | 2009110754 | 10/2009 |
| WO | 2010086041 | 8/2010 |
| WO | 2012045225 | 4/2012 |
| WO | 2006000504 | 6/2012 |
| WO | 2012083487 | 6/2012 |
| WO | 2012125178 | 9/2012 |
| WO | 2013048908 | 4/2013 |

OTHER PUBLICATIONS

Combined Search and Examination Report received for GB1011216.7, dated Oct. 14, 2010, 6 pages.
Combined Search and Examination Report received for GB1015985.3, dated Jan. 17, 2011, 5 pages.
Final Office Action for U.S. Appl. No. 10/848,992 dated Nov. 28, 2008, 12 pages.
Final Office Action for U.S. Appl. No. 12/767,744 dated Jan. 17, 2012, 6 pages.
International Preliminary Report on Patentability and Written Opinion received for PCT Patent Application No. PCT/US2012/056682, dated Apr. 1, 2014.
International Preliminary Report on Patentability and Written Opinion received for PCT Patent Application No. PCT/CN2010/002107, dated Jun. 25, 2013.
International Preliminary Report on Patentability received for PCT Application No. PCT/CN2011/000568, dated Apr. 18, 2013.
International Search Report and Written Opinion received for PCT Patent Application No. PCT/CN2011/000568, dated Jan. 19, 2012.
International Search Report and Written Opinion received for PCT Patent Application No. PCT/CN2010/002107, dated Oct. 13, 2011.
Japanese Office Action received for Japanese Patent Application No. 2011-004871, dated Aug. 14, 2012.
Japanese Office Action received for Japanese Patent Application No. 2011-004871, dated Nov. 20, 2014, 4 pages of Office Action, including 2 pages of English Translation.
Korean Office Action received for Korean Patent Application No. 1020110004254, dated Dec. 26, 2012; 5 pages of Office Action, including 2 pages of English Translation.
Non-Final Office Action for U.S. Appl. No. 10/848,992 dated Dec. 12, 2007, 7 pages.
Non-Final Office Action for U.S. Appl. No. 10/848,992 dated May 15, 2009, 13 pages.
Non-Final Office Action for U.S. Appl. No. 12/767,744 dated Apr. 18, 2011, 7 pages.
Non-Final Office Action for U.S. Appl. No. 13/679,957 dated Feb. 21, 2014, 7 pages.
Non-Final Office Action dated Jul. 31, 2015 for U.S. Appl. No. 14/140,349.
Notice of Allowance for U.S. Appl. No. 14/140,349 dated Apr. 27, 2016, 5 pages.
Notice of Allowance for U.S. Appl. No. 10/848,992 dated Dec. 11, 2009, 4 pages.
Notice of Allowance for U.S. Appl. No. 12/767,744 dated Oct. 16, 2012, 5 pages.
Notice of Allowance for U.S. Appl. No. 13/679,957 dated Jul. 10, 2014, 5 pages.
Notice of Allowance received for Chinese Patent Application No. 201010507057.2, dated Mar. 6, 2014.
Notice of allowance received for Japanese Patent Application No. 2010211120, dated Jan. 24, 2012, 1 page.
Notice of Allowance received for Korean Patent Application No. 10-2010-0102216, dated Nov. 26, 2012, 3 pages of English Translation.
Notice of Allowance received for Korean Patent Application No. 10-2010-064539, dated Sep. 27, 2012, 3 pages of Notice of Allowance, including 1 page of English Translation.
Office Action for U.S. Appl. No. 15/245,975 dated Oct. 2, 2017.
Office Action received for China Patent Application No. 201010507057.2, dated Apr. 12, 2013, 12 pages, including 7 pages of English Translation.
Office Action Received for Chinese Patent Application No. 20100507057.2, dated Aug. 3, 2012, 3 pages of Office Action and 3 pages of English Translation.
Office Action received for Chinese Patent Application No. 201010270056.0, dated May 3, 2012.
Office Action received for Chinese Patent Application No. 2010-10270056.0, dated May 27, 2013.
Office Action received for Chinese Patent Application No. 201010507057.2, dated Aug. 3, 2012, 3 pages of Office Action and 3 pages of English Translation.
Office Action received for Chinese Patent Application No. 201010270056.0, dated Dec. 13, 2012, including 5 pages of English Translation.
Office Action received for Chinese Patent Application No. 201010507057.2, dated Oct. 28, 2013.
Office Action received for Chinese Patent Application No. 201110056040.4, dated Mar. 31, 2014.
Office Action received for Chinese Patent Application No. 201110056040.4, dated Sep. 2, 2013.
Office Action received for German Patent Application No. 10 2010 046 508.9, dated Jul. 26, 2011.

(56) References Cited

OTHER PUBLICATIONS

Office Action received for German Patent Application No. 10 2010 046 508.9, dated Sep. 5, 2012, 13 pages of Office Action, including 5 pages of English Translation.
Office Action received for Japanese Patent Application No. 2013532027, dated Jan. 21, 2014.
Office Action received for Japanese Patent Application No. 2013540202, dated Feb. 4, 2014.
Office Action received for Korean Patent Application No. 10-2010-4254, dated Feb. 10, 2012.
Office Action received for Korean Patent Application No. 1020137002525, dated Jan. 24, 2014.
Office Action received for Korean Patent Application No. 2010-0102216, dated May 22, 2012.
Office Action received for Korean Patent Application No. 10-2010-064539, dated Feb. 10, 2012.
Office Action received for Korean Patent Application No. 10-2011-4254, dated Jun. 19, 2013.
Office Action received for Taiwanese Patent Application No. 100101277, dated Feb. 14, 2014.
Office Action received for Taiwanese Patent Application No. 100101277, dated Aug. 7, 2013.
Office Action received in U.S. Appl. No. 12/566,823, dated Jan. 10, 2012, 10 pages.
"Content description data", Telecommunication Standardization Sector of ITU, Erratum 1, Recommendation ITU-T H.262 Amendment 1, Geneva, Apr. 22, 2002. 1 page.
"Infrastructure of audiovisual services—Coding of moving video", International Telecommunication Union, Series H: Audiovisual and Multimedia Systems, H.262, Feb. 2000, 220 pages.
"MVC Decoder Description", ITU-Telecommunication Standardization Sector, Study Group 16, Study Period 1997-2000, Geneva Feb. 7-18, 2000.
"Series H: Audiovisual and Multimedia Systems Infrastructure of audiovisual services—Coding of moving video", InternationalTelecommunicationUnion, H.262,Amendment 2, Jan. 2007, Information technology—Generic coding of moving pictures and associated audio information: Video Amendment 2: Support for colour spaces, 14 pages.
"Series H: Audiovisual and Multimedia Systems Infrastructure of audiovisual services—Coding of moving video", InternationalTelecommunicationUnion, H.262, Corrigendum 2, Information technology—Generic coding of moving pictures and associated audio information: Video Technical Corrigendum 2, May 2006, 14 pages.
"Series H: Audiovisual and Multimedia Systems Infrastructure of audiovisual services—Coding of moving video", International Telecommunication Union, H.262, Amendment 1, Nov. 2000, 26 pages.
"Series H: Audiovisual and Multimedia Systems Infrastructure of audiovisual services—Coding of moving video", International Telecommunication Union, H.262, Amendment 4, Feb. 2012, Information technology—Generic coding of moving pictures and associated audio information: Video: Frame packing arrangement signalling for 3D content, 238 pages.
"Series H: Audiovisual and Multimedia Systems Infrastructure of audiovisual services—Coding of moving video", International Telecommunication Union, H.262, Corrigendum 1, Nov. 2000, 10 pages.
"Series H: Audiovisual and Multimedia Systems Infrastructure of audiovisual services—Coding of moving video", International Telecommunication Union, H.264, Jan. 2012, Recommendation ITU-T H.264, 680 pages.
"Series H: Audiovisual and Multimedia Systems Infrastructure of audiovisual services—Coding of moving video", International Telecommunication Union, H.264, Nov. 2007, Advanced video coding for generic audiovisual services, 564 pages.
"Series H: Audiovisual and Multimedia Systems Infrastructure of audiovisual services—Coding of moving video", International Telecommunication Union; H.264, Feb. 2014, Advanced video coding for generic audiovisual services, 790 pages.
"Working Draft No. 2, Revision 0 (WD-2)", Document JVT-B118, Dec. 3, 2011, pp. 3-100; p. 27, paragraph 4.4.4 to p. 32, paragraph 4.4.5.
Anttila, et al., "Transferring Real-Time Video on the Internet", www.tml.hut.fi/Opinnot/Tik-110.551/1997/iwsem.html, printed Aug. 4, 2000.
Bares, "Digital Image Processing: Principles and Applications", John Wiley & Sons, 1994, 88-91.
Bjontegaard,"H.26L Test Model Long Term 8 (TML-8) draft0", ITU Study Group 16, Apr. 2, 2001, 1-2, 16-19.
Bjontegaard,"Video Coding Experts Group (Question 15)", ITU—Telecommunications Standardization Section, Document Q15-F-11, Sixth Meeting: Seoul, Korea, Nov. 3-6, 1998.
Bjontegaard,"Video Coding Experts Group (Question 15)", ITU—Telecommunications Standardization Section, Document Q15-J-72, Tenth Meeting: Osaka, May 16-18, 2000.
Blume, "New Algorithm for Nonlinear Vector-Based Upconversion with Center Weighted Medians", Journal of Electronic Imaging 6(3), Jul. 1997, 368-378.
Blume, "Nonlinear Vector Error Tolerant Interploation of Intermediate Video Images by Weighted Medians", Signal Processing Image Communication, vol. 14, (Search Report PCTUS00/18386), 851-868.
Chen, et al., "A Macroblock Level Adaptive Search Range Algorithm for Variable Block Size Motion Estimation in h.264/avc", International Symposium on Intelligent Signal Processing and Communication Systems, ISPACS, Xiamen, China, Nov. 28, 2007-Dec. 1, 2007, 598-601.
Chen, et al., "Source Model for Transform Video Coder and its Application—Part II: Variable Frame Rate Coding", XP000687649, IEEE Transactions on Circuits and Systems for Video Technology, vol. 7, No. 2, Apr. 1997.
Chiu, et al., "Fast Techniques to Improve Self Derivation of Motion Estimation", Joint Collaborative Team on Video Coding (JCT-VC) of ITU-T SG16 WP3 and ISO/IEC JTC1/SC29/WG11, JCTVC-B047, Jul. 21-28, 2010 (10 pages).
Chiu, et al., "Report of Self Derivation of Motion Estimation Improvement in TMuC", Joint Collaborative Team on Video Coding (JCT-VC) of ITU-T SG16 WP3 and ISO/IEC JTC1/SC29/WG11, URL: hftp://phenix,int-evry.fr/jct/doc_end_user/documents/3_Guangzhou/wg11/JCTVC-C127-m18151-v1-JCTVC-C127.zip (see JCTVC-C127.doc), Oct. 3, 2010 (13 pages).
Chiu, et al., "Self-Derivation of Motion Estimation Techniques to Improve Video Coding Efficientcy", Applications of Digital Image Processing XXXIII Proc. of SPIE, vol. 7798, Sep. 7, 2010 (11 pages).
Haavisto, et al., "Motion Adaptive Scan Rate Up-Conversion", Multidimensional Systems and Signal Processing, XP 000573419, vol. 3, 1992 (Search Report PCTUS/183836 and PCTUS00/18390), 113-130.
Han, et al., "Frame-Rate Up-Conversion Using Transmitted Motion and Segmentation Fields for Very Low Bit-Rate Video Coding", Proceedings for ICIP (International Conference on Image Processing), 1997, 747-750.
Hsia, et al., "High Efficiency and Low Complexity Motion Estimation Algorithm for MPEG-4 AVC/H.264 Coding", Tamkang Journal of Science and Engineering, 2007,vol. 10, No. 3, 221-234.
Kamp, et al., "Decoder Side Motion Vector Derivation for Inter Frame Video Coding", 15th IEEE International Conference on Image Processing (ICIP 2008). Oct. 12-15, 2008, pp. 1120-1123.
Kamp, et al., "Fast Decoder Side Motion Vector Derivation for Inter Frame Video Coding", Proceedings of the International Picture Coding Symposium (PCS) '09, Digital Object Identifier 10.1109/PCS.2009.5167453, Print ISBN 978-1-4244-4593-6, IEEE, Piscataway, Chicago, IL, USA, May 6-8, 2009, 4 pages.
Kim, et al., "Local Motion-Adaptive Interpolation Technique Based on Block Matching Algorithms", Signal Processing Image Communication, Nov. 1992, No. 6 Amsterdam.
Kiranyaz, et al., "Motion Compensated Frame Interpolation Techniques for VLBR Video Coding", Proceedings for ICIP (International Conference on Image Processing), 1997.

(56) References Cited

OTHER PUBLICATIONS

Klomp, et al., "Decoder-Side Block Motion Estimation for H.264/MPEG-4 AVC Based Video Coding", IEEE International Symposium on Circuits and Systems (ISCAS 2009), May 24-27, 2009, pp. 1641-1644.

Kokaram, et al., "Detection and Removal of Impulsive Noise in Image Sequences", Proceedings of the Singapore International Conference on Image Processing, Sep. 1992, Singapore.

Kronander, "Post and Pre-Processing in Coding of Image Sequences Using Filters with Motion Compensated History", International Conference on Acoustics, Speech, and Signal Processing, Apr. 1988, New York City.

Laroche, et al., "RD Optimized Coding for Motion Vector Predictor Selection", IEEE Transactions on Circuits and Systems for Video Technology, vol. 18(12), Dec. 2008, pp. 1681-1691.

Migliorati, et al., "Multistage Motion Estimation for Image Interpolation", Signal Processing Image Communication, vol. 7, 1995, 187-199.

Murakami, et al., "Advanced B Skip Mode with Decoder-Side Motion Estimation", 37th VCEG meeting at Yokohama, VCEG-AK12, Hitachi Inspire the Next, Central research Laboratory, Embedded System Platform Research Laboratory.

Nisar, et al., "Fast Motion Estimation Algorithm Based on Spatio-Temporal Correlation and Direction of Motion Vectors", Electronics Letters, Dept. of Mechatronics, Gwangju Inst. of Sci & Technol. 11/23/20016, vol. 42, No. 24.

Poynton, "A Technical Introduction to Digital Video", John Wiley & Sons, 1996, 8-11.

Sadka, et al., "Error Performance Improvement in Block-Transform Video Coders", www.research.att.com/mrc/pv99/contents/papers/sadka/sadka.htm printed Aug. 4, 2000.

Sallent, "Simulation of a Teleconference Codec for ISDN", Proceedings of the European Signal Proceeding Conference, vol. 4, Amsterdam, Sep. 1990.

Sato, et al., "Video OCR for Digital News Archive", IEEE International Workshop on content-Based Access of Image and Video Database, XP002149702, 1998, 52-60.

Stallings, et al., "Business Data Communications", Third Edition, 198, Prentice-Hall, Inc., Chapter 2.

Thomas, "A Comparison of Motion-Compensated Interlace-to-Progressive Conversion Methods", Signal Processing Image Communication, vol. 12, 1998, 209-229.

Werda, et al., "Optimal DSP-Based Motion Estimation Tools Implementation for H.264/AVC Baseline Encoder", IJCSNS International Journal of Computer Science and Network Security, May 2007, vol. 7, No. 5, 141-150.

"An Introduction to MPEG Video Compression", members.aol.com/symbandgrl printed Apr. 14, 2000.

\* cited by examiner

SYSTEM AND METHOD FOR INTRACODING VIDEO DATA

CLAIM OF PRIORITY

This is a continuation of U.S. patent application Ser. No. 15/245,975, filed on Aug. 24, 2016, now patented as U.S. Pat. No. 9,930,343, issued on Mar. 27, 2018, which is a continuation of U.S. patent application Ser. No. 14/140,349, filed on Dec. 24, 2013, now patented as U.S. Pat. No. 9,432,682, issued on Aug. 30, 2016, which is a divisional of U.S. patent application Ser. No. 13/679,957, filed on Nov. 16, 2012, now patented as U.S. Pat. No. 8,908,764, issued on Dec. 9, 2014, which is continuation of U.S. patent application Ser. No. 12/767,744, filed on Apr. 26, 2010, now patented as U.S. Pat. No. 8,385,415, issued on Feb. 26, 2013, which is continuation of U.S. patent application Ser. No. 10/848,992, filed on May 18, 2004, now patented as U.S. Pat. No. 7,706,444, issued on Apr. 27, 2010, which is a continuation of U.S. patent application Ser. No. 09/732,522, filed on Dec. 6, 2000, now patented as U.S. Pat. No. 6,765,964, issued on Jul. 20, 2004, which are hereby incorporated by reference in their entireties for all purposes.

BACKGROUND OF THE INVENTION

Field of the Invention

The invention pertains to a video system that compresses video data for transmission or storage and decompresses the video data for display. More particularly, the invention pertains to a video system and a method for intracoding video data.

Description of the Related Art

Video systems transmit, process and store large quantities of video data. To create a video presentation, such as a video movie, a rendering video system displays the video data as a plurality of digital images, also referred to as "frames," thereby simulating movement. In order to achieve a video presentation with an acceptable video quality, or to enable transmission and storage at all, a conventional video system modifies the video data prior to transmission or storage. For instance, the video system compresses and encodes the video data to reduce the bit rate for storage and transmission.

In a conventional video system a video encoder is used to compress and encode the video data and a video decoder is used to decompress and to decode the video data. The video encoder outputs video data that has a reduced bit rate and a reduced redundancy. That is, the technique of video compression removes spatial redundancy within a video frame or temporal redundancy between consecutive video frames.

The video encoder and video decoder may be configured to apply one of two types of coding to compress the video stream, namely intracoding and intercoding. These two types of coding are based on the statistical properties of the video frames. When the video frames are coded using intracoding, the compression is based on information contained in a single frame (the frame that is compressed) by using the spatial redundancy within the frame. Intracoding, thus, does not depend on any other frames. In contrast, intercoding uses at least one other frame as a reference and codes a difference between the frame to be compressed and the reference frame. Intercoding is thus based on a temporal redundancy between consecutive frames in the video data.

The field of video compression is subject to international standards, e.g., International Telecommunications Union (ITU) standard H.263 that defines uniform requirements for video coding and decoding. In addition, manufacturers of video coders and decoders modify or build upon the international standards and implement proprietary techniques for video compression.

Despite the existence of the international standards and the proprietary techniques, there is still a need for improved techniques for video compression. For example, as the quality of a displayed video movie depends directly from the technique used for video compression, any improvement of the video compression technique makes the video movie more pleasing for the viewer.

SUMMARY OF THE INVENTION

An aspect of the invention involves a method of coding a stream of video data including a stream of video frames. The method divides each video frame into a matrix of a plurality of subblocks, wherein each subblock includes a plurality of pixels. The method further defines nine prediction modes, wherein each prediction mode determines a mode according to which a present subblock is to be coded. The method further selects one of the nine prediction modes to encode the present subblock. The selected prediction mode provides for a minimum error value in the present subblock.

Another aspect of the invention involves a video system for coding and decoding a stream of video data that includes a stream of video frames. The video system includes a video encoder and a mode selector. The video encoder is configured to receive a stream of video data including a stream of video frames and to divide each video frame into a matrix of a plurality of subblocks, wherein each subblock includes a plurality of pixels. The mode selector is in communication with the video encoder and is configured to define nine prediction modes. Each prediction mode determines a mode according to which a present subblock is to be coded. The mode selector is further configured to select one of the nine prediction modes to encode the present subblock, wherein the selected prediction mode provides for a minimum error value in the present subblock.

Once the video system has selected the best prediction mode to encode the pixels of the present subblock, the video system encodes the minimum error value and transmits the encoded minimum error value within a compressed bitstream to the decoder. The minimum error value represents a difference between predicted pixels of the present subblock and the original pixels of the subblock. The decoder uses the predicted pixels and the difference to the original pixels to accurately reconstruct the video frame.

BRIEF DESCRIPTION OF THE DRAWINGS

These and other aspects, advantages, and novel features of the invention will become apparent upon reading the following detailed description and upon reference to the accompanying drawings.

DETAILED DESCRIPTION OF THE PREFERRED EMBODIMENT

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent devices and methods to those described herein. In other instances, well-known methods, procedures, components, and devices have not been described in detail so as not to unnecessarily obscure aspects of the present invention.

Figure 1:
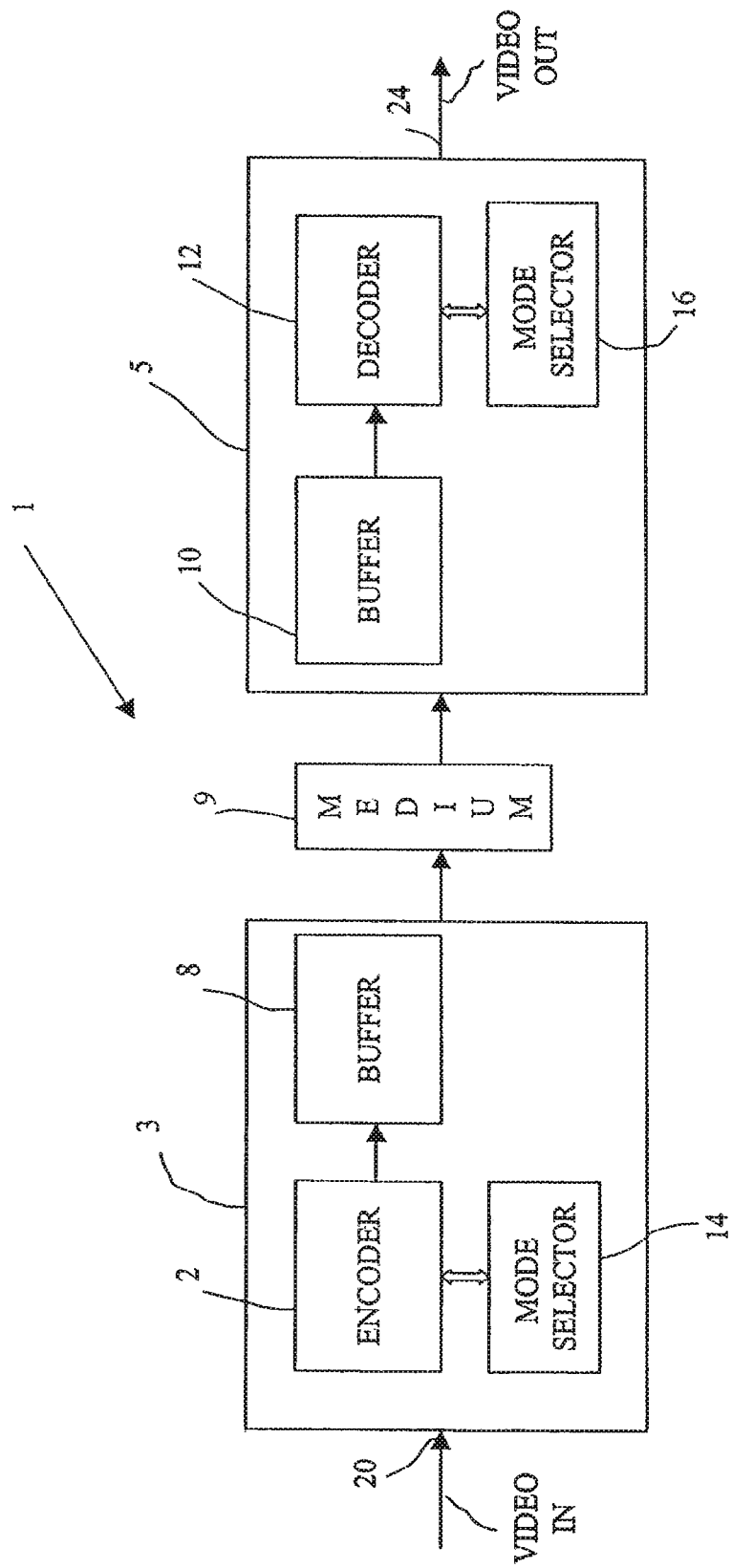
FIG. 1 is a high-level block diagram of a system for video applications having an encoding side and a decoding side.

FIG. 1 is a high-level block diagram of a video compression and decompression system 1 (hereinafter "video system 1") having an encoder apparatus 3 and a decoder apparatus 5 that is coupled to the encoder apparatus 3 through a medium 9. The encoder apparatus 3 includes a video encoder 2, a mode selector 14 and a buffer 8. The decoder apparatus 5 includes a buffer 10, a video decoder 12 and a mode selector 16. The encoder apparatus 3 receives a video sequence 20 (VIDEO IN) and encodes the video sequence 20 to generate an encoded and thus compressed representation in one of a number of possible formats. The format may be in an interleaved format tailored for "live" streaming of the encoded representation. The format may also be in a single file format in which each of the encoded representation is stored in a contiguous block within one file.

The video sequence 20 input to the encoder apparatus 3 may be either a live signal, e.g., provided by a video camera, or a prerecorded sequence in a predetermined format. The video sequence 20 includes frames of a digital video, an audio segment consisting of digital audio, combinations of video, graphics, text, and/or audio (multimedia applications), or analog forms of the aforementioned. If necessary, conversions can be applied to various types of input signals such as analog video, or previously compressed and encoded video to produce an appropriate input to the encoder apparatus 3. In one embodiment, the encoder apparatus 3 may accept video in RGB or YUV formats. The encoder apparatus 3, however, may be adapted to accept any format of input as long as an appropriate conversion mechanism is supplied. Conversion mechanisms for converting a signal in one format to a signal in another format are well known in the art.

The medium 9 may be a storage device or a transmission medium. In one embodiment, the video system 1 may be implemented on a computer. The encoder apparatus 3 sends an encoded video stream (representation) to the medium 9 that is implemented as a storage device. The storage device may be a video server, a hard disk drive, a CD rewriteable drive, a read/write DVD drive, or any other device capable of storing and allowing the retrieval of encoded video data. The storage device is connected to the decoder apparatus 5, which can selectively read from the storage device and decode the encoded video sequence. As the decoder apparatus 5 decodes a selected one of the encoded video sequence, it generates a reproduction of the video sequence 20, for example, for display on a computer monitor or screen.

In another embodiment, the medium 9 provides a connection to another computer, which may be a remote computer, that receives the encoded video sequence. The medium 9 may be a network connection such as a LAN, a WAN, the Internet, or the like. The decoder apparatus 5 within the remote computer decodes the encoded representations contained therein and may generate a reproduction of the video sequence 20 on a screen or a monitor of the remote computer.

Aspects of the video system 1 illustrated in FIG. 1 and described above can be combined and supplemented to achieve other embodiments. Numerous other implementations are consistent with the scope of this invention. Such other implementations need not be restricted to video, but may include audio or other forms of media as well.

Pre-existing video encoding techniques typically break up a frame (picture) into smaller blocks of pixels called macroblocks. Each macroblock can consist of a matrix of pixels, typically a 16×16 matrix, defining the unit of information at which encoding is performed. The matrix of pixels is therefore referred to as a 16×16 macroblock. These video encoding techniques usually break each 16×16 macroblock further up into smaller matrices of pixels. For example, into 8×8 matrices of pixels or 4×4 matrices of pixels. Such matrices are hereinafter referred to as subblocks. In one embodiment of the present invention, a 16×16 macroblock is divided into 16 4×4 subblocks. Those skilled in the art will appreciate that the present invention is equally applicable to systems that use 8×8 subblocks, 4×4 subblocks or only 16×16 macroblocks without breaking it up into subblocks.

Further, the pre-existing encoding techniques provide for motion compensation and motion estimation using motion vectors. The motion vectors describe the direction, expressed through an x-component and a y-component, and the amount of motion of the 16×16 macroblocks, or their respective subblocks, and are transmitted to the decoder as part of the bit stream. Motion vectors are used for bidirectionally encoded pictures (B-pictures) and predicted pictures (P pictures) as known in the art.

The video encoder 2 performs a discrete cosine transform (DCT) to encode and compress the video sequence 20. Briefly, the video encoder 2 converts the video sequence 20 from the spatial, temporal domain into the frequency domain. The output of the video encoder 2 is a set of signal amplitudes, called "DCT coefficients." A quantizer receives the DCT coefficients and assigns each of a range (or step size) of DCT coefficient values a single value, such as a small integer, during encoding. Quantization allows data to be represented more compactly, but results in the loss of some data. Quantization on a finer scale results in a less compact representation (higher bit-rate), but also involves the loss of less data. Quantization on a more coarse scale results in a more compact representation (lower bit-rate), but also involves more loss of data. The mode selector 14 communicates with the video encoder 2 and monitors and controls encoding of the video sequence 20. The mode selector 14 determines in accordance with the present invention prediction modes according to which the video encoder 2 encodes the video sequence 20. The mode selector 14 may be a processor or a software module that are configured to operates in accordance with a method of the present invention. FIG. 1 shows the mode selector 14 for illustrative purposes as an element separate from the video encoder 2. Those skilled in the art will appreciate that the functionality of the mode selector 14 may be combined with the functionality of the video encoder 2.

The buffer 8 of the encoder apparatus 3 receives the encoded and compressed video sequence (hereinafter "encoded video sequence") from the video encoder 2 and adjusts the bit rate of the encoded video sequence before it is sent to the medium 9. Buffering may be required because individual video images may contain varying amounts of information, resulting in varying coding efficiencies from image to image. As the buffer 8 has a limited size, a feedback loop to the quantizer may be used to avoid overflow or underflow of the buffer 8. The bit-rate of the representation is the rate at which the representation data must be processed in order to present the representation in real time.

The decoder apparatus 5 performs the inverse function of the encoder apparatus 3. The buffer 10 serves also to adjust the bit rate of the incoming encoded video sequence. The video decoder 12 decodes and decompresses in combination with the mode selector 16 the incoming video sequence reconstructing the video sequence. The mode selector 16 determines the prediction modes according to which the video encoder 2 encoded the incoming video sequence. The decoder apparatus 5 outputs a decoded and decompressed video sequence 24 illustrated as "VIDEO OUT" (hereinafter "decoded video sequence 24").

The video decoder 12 receives a bit stream that represents the encoded video sequence from the buffer 10 (FIG. 1). In one embodiment, the video decoder is a conventional video decoder, e.g., a MPEG-2 decoder, that includes a decoder controller, a VLC decoder (Variable Length Coding, VLC) and a reconstruction module. The operation and function of these components are known to those skilled in the art. These components are known to those skilled in the art and described in generally available MPEG documents and publications.

Figure 2:
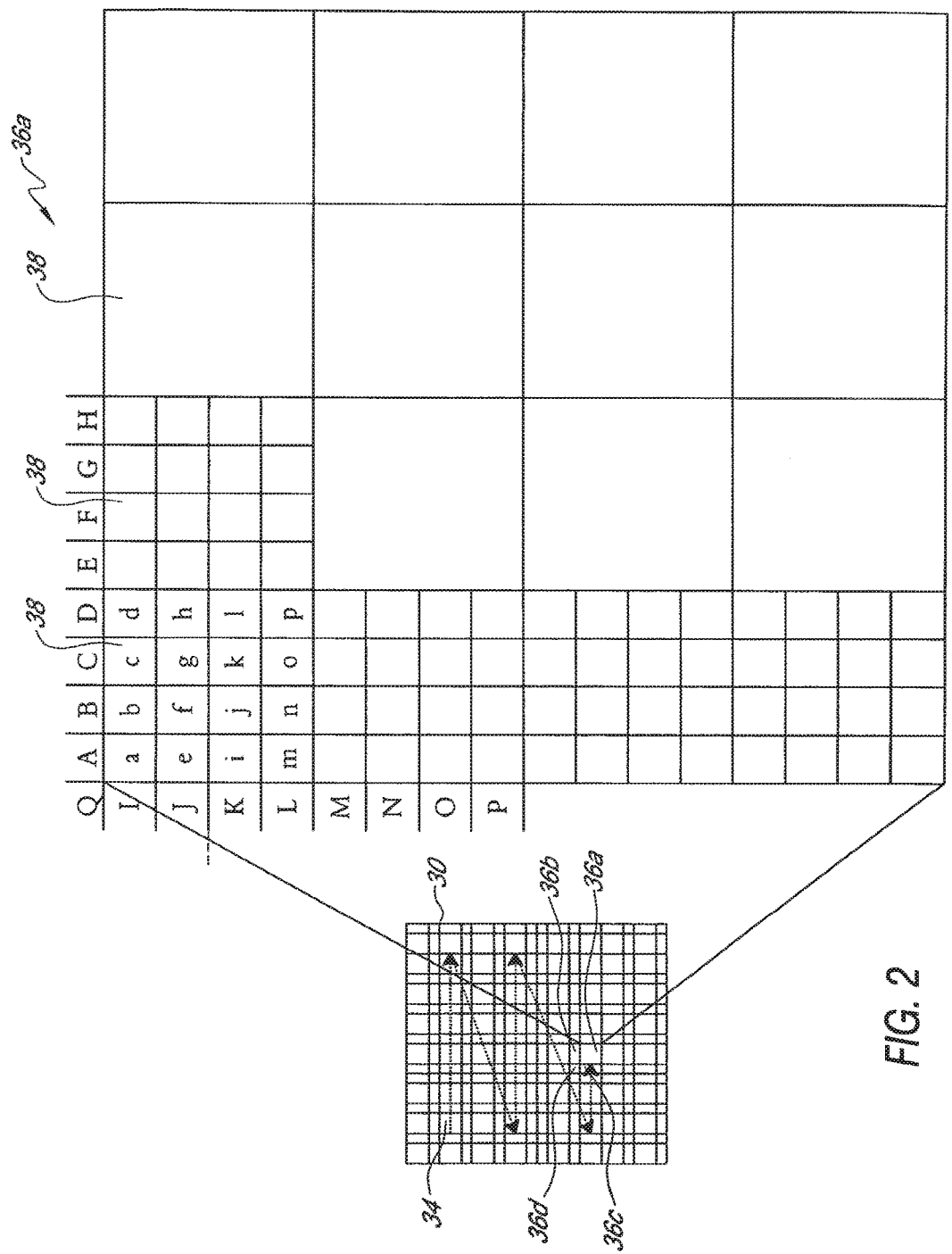
FIG. 2 is a high-level illustration of a frame and its division in macroblocks and subblocks.

FIG. 2 is a diagram illustrating a video frame 30 that is part of the video sequence 20. As described above, known video encoding techniques typically break up a video frame 30 into macroblocks 36, 36a, 36b, 36c, 36d. For example, the video frame 30 is divided into a matrix of 16×16 macroblocks 36, 36a, 36b, 36c, 36d. The video system 1 encodes the macroblocks 36, 36a, 36b, 36c, 36d line by line, from top to bottom and from left to right, as indicated through a dashed line 34 that illustrates the sequence of, e.g., intra encoding. In the illustrated embodiment, the dashed line 34 ends at the macroblock 36a, which is the next macroblock to be encoded. All prior macroblocks 36, 36b, 36c, 36d have already been encoded.

The macroblock 36a, as a representative for all macroblocks 36, 36a, 36b, 36c, 36d, is shown in greater detail below the video frame 30. The video encoding technique of the video system 1 breaks each macroblock 36, 36a, 36b, 36c, 36d further up into a matrix of pixels 38, hereinafter referred to as a subblock 38. In one embodiment, the subblock 38 is a 4×4 matrix of pixels, wherein the 16 pixels are labeled as a, b, c, p. Bordering pixels of an adjacent subblock of a neighboring macroblock 36b, which is located above the macroblock 36a, are labeled as A, B, C, D. Further, bordering pixels of a subblock located above and to the right of the macroblock 36a are labeled as E, F, G, H. Likewise, bordering pixels of an adjacent subblock of a neighboring macroblock 36c, which is located to the left of the macroblock 36a, are labeled as I, J, K, L. Bordering pixels of a subblock located below and to the left of the macroblock 36a are labeled as M, N, O, P. A bordering pixel of a subblock of a macroblock 36d, which is located above and to the left of the macroblock 36a, is labeled as Q.

The video system 1 of the present invention codes each macroblock 36 as an intra macroblock. Intra macroblocks are transform encoded without motion compensated prediction. Thus, intra macroblocks do not reference decoded data from either previous or subsequent frames. An I-frame is a frame consisting completely of intra macroblocks. Thus, I-frames are encoded with no reference to previous or subsequent frames. I-frames are also known as "Intra-frames."

Figure 3:
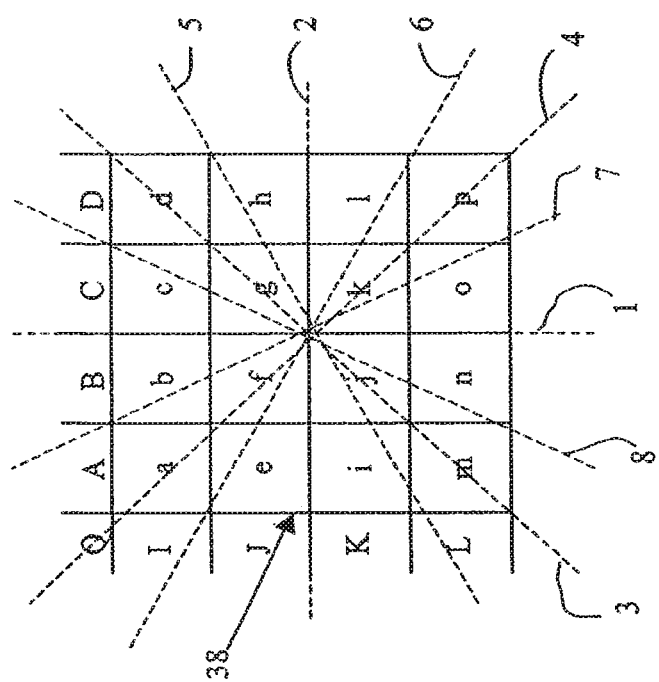
FIG. 3 is a subblock illustrating the directions according to which the subblock can be encoded, wherein each direction represents one of eight prediction modes in accordance with the present invention.

FIG. 3 is a subblock 38 illustrating possible directions according to which the subblock 38 may be encoded. In accordance with the present invention, the subblocks of a macroblock 36, 36a, 36b, 36c, 36d can be intra coded in one of nine modes (Modes 0, Mode 1, . . . , Mode 9) as listed hereinafter. That is, a particular subblock 38 may be predicted from a subblock above the current subblock that is currently decoded ("vertical prediction"), from the subblock to the left of the current subblock ("horizontal prediction"), or from both the left and the above subblocks ("diagonal prediction"). The Modes 1-8 predict the subblock in a predetermined direction and the Mode 0 uses a uniform average without prediction in a predetermined direction. In FIG. 3, each direction represents one of the eight prediction modes in accordance with the present invention.

Mode 0:

In this mode, each pixel a-p is predicted by the following equation:

$$a, b, c, d, \ldots, p = \frac{A + B + C + D + I + J + K + L + 4}{8}.$$

It is contemplated that in this mode as well as in the following modes, a "division" means to round the result down toward "minus infinity" ($-\infty$). For instance, in mode 0, the term "+4" ensures that the division results in a rounding to the nearest integer. This applies also the other modes.

If four of the pixels A-P are outside the current picture (frame) that is currently encoded, the average of the remaining four pixels is used for prediction. If all eight pixels are outside the picture, the prediction for all pixels in this subblock is 128. A subblock may therefore always be predicted in mode 0.

Mode 1:

If the pixels A, B, C, D are inside the current picture, the pixels a-p are predicted in vertical direction as shown in FIG. 3. That is, the pixels a-p are predicted as follows:

| | | |
|---|---|---|
| a, e, i, m | = | A |
| b, f, j, n | = | B |
| c, g, k, o | = | C |
| d, h, l, p | = | D |

Mode 2:

If the pixels I, J, K, L are inside the current picture, the pixels a-p are predicted in horizontal direction. That is, the pixels a-p are predicted as follows:

| | | |
|---|---|---|
| a, b, c, d | = | I |
| e, f, g, h | = | J |

| | | |
|---|---|---|
| i, j, k, l | = | K |
| m, n, o, p | = | L |

Mode 3:

This mode is used if all pixels A-P are inside the current picture. This corresponds to a prediction in a diagonal direction as shown in FIG. 3. The pixels a-p are predicted as follows:

| | | |
|---|---|---|
| m | = | (J + 2K + L + 2)/4 |
| i, n | = | (I + 2J + K + 2)/4 |
| e, j, o | = | (Q + 2I + J + 2)/4 |
| a, f, k, p | = | (I + 2Q + A + 2)/4 |
| b, g, l | = | (Q + 2A + B + 2)/4 |
| c, h | = | (A + 2B + C + 2)/4 |
| d | = | (B + 2C + D + 2)/4 |

Mode 4:

This mode is used if all pixels A-P are inside the current picture. This is also a diagonal prediction.

| | | |
|---|---|---|
| a | = | (A + 2B + C + I + 2J + K + 4)/8 |
| b, e | = | (B + 2C + D + J + 2K + L + 4)/8 |
| c, f, i | = | (C + 2D + E + K + 2L + M + 4)/8 |
| d, g, j, m | = | (D + 2E + F + L + 2M + N + 4)/8 |
| h, k, n | = | (E + 2F + G + M + 2N + O + 4)/8 |
| l, o | = | (F + 2G + H + N + 2O + P + 4)/8 |
| p | = | (G + H + O + P + 2)/4 |

Mode 5:

This mode is used if all pixels A-P are inside the current picture. This is also a diagonal prediction.

| | | |
|---|---|---|
| a, j | = | (Q + A + 1)/2 |
| b, k | = | (A + B + 1)/2 |
| c, l | = | (B + C + 1)/2 |
| d | = | (C + D + 1)/2 |
| e, n | = | (I + 2Q + A + 2)/4 |
| f, o | = | (Q + 2A + B + 2)/4 |
| g, p | = | (A + 2B + C + 2)/4 |
| h | = | (B + 2C + D + 2)/4 |
| i | = | (Q + 2I + J + 2)/4 |
| m | = | (I + 2J + K + 2)/4 |

Mode 6:

This mode is used if all pixels A-P are inside the current picture. This is a diagonal prediction.

| | | |
|---|---|---|
| a | = | (2A + 2B + J + 2K + L + 4)/8 |
| b, i | = | (B + C + 1)/2 |
| c, j | = | (C + D + 1)/2 |
| d, k | = | (D + E + 1)/2 |
| l | = | (E + F + 1)/2 |
| e | = | (A + 2B + C + K + 2L + M + 4)/8 |
| f, m | = | (B + 2C + D + 2)/4 |
| g, n | = | (C + 2D + E + 2)/4 |
| h, o | = | (D + 2E + F + 2)/4 |
| p | = | (E + 2F + G + 2)/4 |

Mode 7:

This mode is used if all pixels A-P are inside the current picture. This is a diagonal prediction.

| | | |
|---|---|---|
| a | = | (B + 2C + D + 2I + 2J + 4)/8 |
| b | = | (C + 2D + E + I + 2J + K + 4)/8 |
| c, e | = | (D + 2E + F + 2J + 2K + 4)/8 |
| d, f | = | (E + 2F + G + J + 2K + L + 4)/8 |
| g, i | = | (F + 2G + H + 2K + 2L + 4)/8 |
| h, j | = | (G + 3H + K + 2L + M + 4)/8 |
| k, m | = | (G + H + L + M + 2)/4 |
| l, n | = | (L + 2M + N + 2)/4 |
| o | = | (M + N + 1)/2 |
| p | = | (M + 2N + O + 2)/2 |

Mode 8:

This mode is used if all pixels A-P are inside the current picture. This is a diagonal prediction.

| | | |
|---|---|---|
| a, g | = | (Q + I + 1)/2 |
| b, h | = | (I + 2Q + A + 2)/4 |
| c | = | (Q + 2A + B + 2)/4 |
| d | = | (A + 2B + C + 2)/4 |
| e, k | = | (I + J + 1)/2 |
| f, l | = | (Q + 2I + J + 2)/4 |
| i, o | = | (J + K + 1)/2 |
| j, p | = | (I + 2J + K + 2)/4 |
| m | = | (K + L + 1)/2 |
| n | = | (J + 2K + L + 2)/2 |

In one embodiment of the present invention, a mode selection algorithm determines a criteria to select one of the nine modes. The subblock 38 is then encoded in accordance with the selected mode. The mode selection algorithm is described in detail below.

Figure 4:
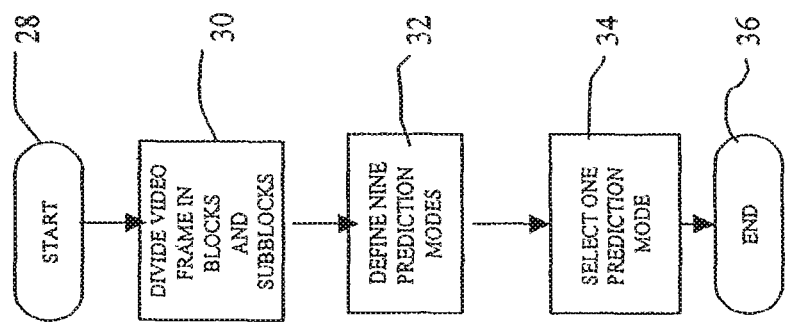
FIG. 4 is a flow chart in accordance with an embodiment of the present invention that selects a prediction mode.

FIG. 4 is a flow chart of a procedure illustrating the method in accordance with the present invention that codes video data including a stream of video frames and that selects one of the prediction modes Modes 0-8. In one embodiment, the method codes a luminance portion (Y) of a video frame.

In a step 28, e.g., when a user activates the video system 1, the procedure initializes the video system 1. The initialization procedure includes, for example, determining whether the encoder apparatus 3 is operating and properly connected to receive the stream of video frames.

In a step 30, the procedure receives the stream of video frames and divides each video frame into a matrix of a plurality of subblocks, wherein each subblock includes a plurality of pixels. The matrix of a plurality of subblocks may include 4×4 subblocks 38 that are part of a macroblock as described above.

In a step 32, the procedure defines the nine prediction modes Mode 0-8, wherein each prediction mode determines a mode according to which a present subblock is to be coded. For example, the procedure may execute a subroutine to calculate and define the modes Mode 0-8.

In a step 34, the procedure selects one of the nine prediction modes Mode 0-8 to encode the present subblock 38. In one embodiment, the procedure calculates for each mode an error value, determines which mode provides a minimum error value and selects that mode for encoding the present subblock 38.

Once the procedure has selected the "best" prediction mode to encode the pixels of the present subblock 38, the procedure encodes the minimum error value and transmits the encoded minimum error value within a compressed bitstream to the decoder. The minimum error value represents a difference between the predicted pixels of the present subblock and the original pixels of the subblock. The difference may be encoded using a DCT, coefficient quantization and variable length coding as known in the art. The decoder uses the predicted pixels and the difference to the original pixels to accurately reconstruct the video frame. The procedure ends at a step 36.

The procedure provides that each of the 4×4 subblocks 38 is coded in accordance with one of the nine prediction modes Mode 0-8. As this may require a considerable number of bits if coded directly, the video system 1 in accordance with the present invention may apply a more efficient way of coding the mode information. A prediction mode of a subblock is correlated with the prediction modes of adjacent subblocks.

Figure 5:
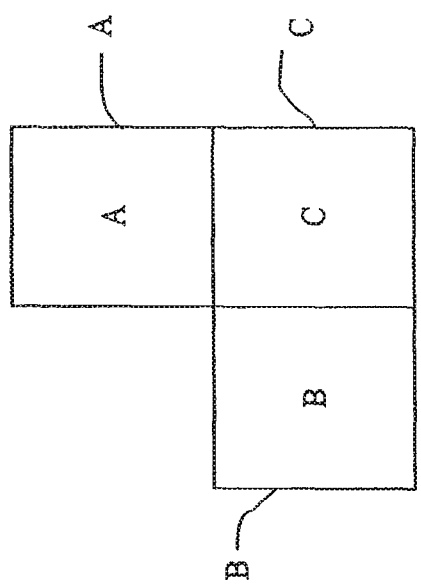
FIG. 5 is an illustration of three neighboring subblocks, wherein two subblocks are used to encode the third subblock.

FIG. 5 illustrates this through three exemplary subblocks A, B, C. The subblock C is the subblock that is to be encoded (predicted) with the help of the subblocks A, B whose prediction modes are known. The subblock A is located above the subblock C and the subblock B is located left of the subblock C. In this case, an ordering of the most probable, next most probable etc. prediction mode for the subblock C is given. An example of such an ordering table is listed hereinafter. The table is divided into ten groups (Group 1-Group 10). In each group, the respective prediction mode for the subblock A is constant (e.g., Mode 0 of the subblock A is constant in Group 2), and the prediction mode for the subblock B varies. That is, the (constant) prediction mode for the subblock A within a group may be combined with one of the nine prediction modes for the subblock B within that group.

For each combination of the prediction modes of the subblocks A and B, a sequence of nine numbers is given, one number for each of the nine Modes 0-9. For example in Group 3, if the prediction modes for the subblock A and the subblock B are both Mode 1, a string "1 6 2 5 3 0 4 8 7" indicates that the Mode 1, i.e., the first number in the string, is the most probable mode for the subblock C. The Mode 6, i.e., the second number in the string, is the next most probable mode. In the exemplary string, the Mode 7 is the least probable since the number 7 is the last number in the string. The string will be part of the stream of bits that represents the encoded video sequence.

The stream of bits therefore includes information (Prob0=1 (see Table 1)) indicating the mode used for the subblock C. For example, the information may indicate that the next most probable intra prediction mode is Mode 6. Note that a "-" in the table indicates that this instance cannot occur. The term "outside" used in the Table 1 indicates "outside the frame." If the subblock A or B is within the frame, but is not INTRA coded (e.g., in a P frame, the subblock C could be INTRA coded but either the subblock A or the subblock B may not be INTRA coded), there is no prediction mode. The procedure of the present invention assumes the Mode 0 for such subblocks.

TABLE 1

| B | A = outside | |
|---|---|---|
| outside | 0 - - - - - - - - | |
| mode 0 | 0 2 - - - - - - - | |
| mode 1 | - - - - - - - - - | |
| mode 2 | 2 0 - - - - - - - | |
| mode 3 | - - - - - - - - - | GROUP 1 |
| mode 4 | - - - - - - - - - | |
| mode 5 | - - - - - - - - - | |
| mode 6 | - - - - - - - - - | |
| mode 7 | - - - - - - - - - | |
| mode 8 | - - - - - - - - - | |

TABLE 1-continued

| B | A = mode 0 | |
|---|---|---|
| outside | 0 1 - - - - - - - | |
| mode 0 | 0 2 1 6 4 8 5 7 3 | |
| mode 1 | 1 0 2 6 5 4 3 8 7 | |
| mode 2 | 2 8 0 1 7 4 3 6 5 | |
| mode 3 | 2 0 1 3 8 5 4 7 6 | GROUP 2 |
| mode 4 | 2 0 1 4 6 7 8 3 5 | |
| mode 5 | 0 1 5 2 6 3 8 4 7 | |
| mode 6 | 0 1 6 2 4 7 5 8 3 | |
| mode 7 | 2 7 0 1 4 8 6 3 5 | |
| mode 8 | 2 8 0 1 7 3 4 5 6 | |

| B | A = mode 1 | |
|---|---|---|
| outside | 1 0 - - - - - - - | |
| mode 0 | 1 2 5 6 3 0 4 8 7 | |
| mode 1 | 1 6 2 5 3 0 4 8 7 | |
| mode 2 | 2 1 7 6 8 3 5 0 4 | |
| mode 3 | 1 2 5 3 6 8 4 7 0 | GROUP 3 |
| mode 4 | 1 6 2 0 4 5 8 7 3 | |
| mode 5 | 1 5 2 6 3 8 4 0 7 | |
| mode 6 | 1 6 0 2 4 5 7 3 8 | |
| mode 7 | 2 1 7 6 0 8 5 4 3 | |
| mode 8 | 1 2 7 8 3 4 5 6 0 | |

| B | A = mode 2 | |
|---|---|---|
| outside | - - - - - - - - - | |
| mode 0 | 0 2 1 8 7 6 5 4 3 | |
| mode 1 | 1 2 0 6 5 7 4 8 3 | |
| mode 2 | 2 8 7 1 0 6 4 3 5 | |
| mode 3 | 2 0 8 1 3 7 5 4 6 | GROUP 4 |
| mode 4 | 2 0 4 1 7 8 6 3 5 | |
| mode 5 | 2 0 1 5 8 4 6 7 3 | |
| mode 6 | 2 0 6 1 4 7 8 5 3 | |
| mode 7 | 2 7 8 1 0 5 4 6 3 | |
| mode 8 | 2 8 7 1 0 4 3 6 5 | |

| B | A = mode 3 | |
|---|---|---|
| outside | - - - - - - - - - | |
| mode 0 | 0 2 1 3 5 8 6 4 7 | |
| mode 1 | 1 0 2 5 3 6 4 8 7 | |
| mode 2 | 2 8 1 0 3 5 7 6 4 | |
| mode 3 | 3 2 5 8 1 4 6 7 0 | GROUP 5 |
| mode 4 | 4 2 0 6 1 5 8 3 7 | |
| mode 5 | 5 3 1 2 8 6 4 0 7 | |
| mode 6 | 1 6 0 2 4 5 8 3 7 | |
| mode 7 | 2 7 0 1 5 4 8 6 3 | |
| mode 8 | 2 8 3 5 1 0 7 6 4 | |

| B | A = mode 4 | |
|---|---|---|
| outside | - - - - - - - - - | |
| mode 0 | 2 0 6 1 4 7 5 8 3 | |
| mode 1 | 1 6 2 0 4 5 3 7 8 | |
| mode 2 | 2 8 7 6 4 0 1 5 3 | |
| mode 3 | 4 2 1 0 6 8 3 5 7 | GROUP 6 |
| mode 4 | 4 2 6 0 1 5 7 8 3 | |
| mode 5 | 1 2 5 0 6 3 4 7 8 | |
| mode 6 | 6 4 0 1 2 7 5 3 8 | |
| mode 7 | 2 7 4 6 0 1 8 5 3 | |
| mode 8 | 2 8 7 4 6 1 3 5 0 | |

| B | A = mode 5 | |
|---|---|---|
| outside | - - - - - - - - - | |
| mode 0 | 5 1 2 3 6 8 0 4 7 | |
| mode 1 | 1 5 6 3 2 0 4 8 7 | |
| mode 2 | 2 1 5 3 6 8 7 4 0 | |
| mode 3 | 5 3 1 2 6 8 4 7 0 | GROUP 7 |
| mode 4 | 1 6 2 4 5 8 0 3 7 | |
| mode 5 | 5 1 3 6 2 0 8 4 7 | |
| mode 6 | 1 6 5 2 0 4 3 7 8 | |
| mode 7 | 2 7 1 6 5 0 8 3 4 | |
| mode 8 | 2 5 1 3 6 8 4 0 7 | |

TABLE 1-continued

| B | A = mode 6 | |
|---|---|---|
| outside | - - - - - - - - - | |
| mode 0 | 1 6 2 0 5 4 3 7 8 | |
| mode 1 | 1 6 5 4 2 3 0 7 8 | |
| mode 2 | 2 1 6 7 4 8 5 3 0 | |
| mode 3 | 2 1 6 5 8 4 3 0 7 | GROUP 8 |
| mode 4 | 6 4 1 2 0 5 7 8 3 | |
| mode 5 | 1 6 5 2 3 0 4 8 7 | |
| mode 6 | 6 1 4 0 2 7 5 3 8 | |
| mode 7 | 2 7 4 6 1 5 0 8 3 | |
| mode 8 | 2 1 6 8 4 7 3 5 0 | |

| B | A = mode 7 | |
|---|---|---|
| outside | - - - - - - - - - | |
| mode 0 | 2 0 4 7 6 1 8 5 3 | |
| mode 1 | 6 1 2 0 4 7 5 8 3 | |
| mode 2 | 2 7 8 0 1 6 4 3 5 | |
| mode 3 | 2 4 0 8 3 1 7 6 5 | GROUP 9 |
| mode 4 | 4 2 7 0 6 1 8 5 3 | |
| mode 5 | 2 1 0 8 5 6 7 4 3 | |
| mode 6 | 2 6 4 1 7 0 5 8 3 | |
| mode 7 | 2 7 4 0 8 6 1 5 3 | |
| mode 8 | 2 8 7 4 1 0 3 6 5 | |

| B | A = mode 8 | |
|---|---|---|
| outside | - - - - - - - - - | |
| mode 0 | 2 0 8 1 3 4 6 5 7 | |
| mode 1 | 1 2 0 6 8 5 7 3 4 | |
| mode 2 | 2 8 7 1 0 3 6 5 4 | |
| mode 3 | 8 3 2 5 1 0 4 7 6 | GROUP 10 |
| mode 4 | 2 0 4 8 5 1 7 6 3 | |
| mode 5 | 2 1 0 8 5 3 6 4 7 | |
| mode 6 | 2 1 6 0 8 4 5 7 3 | |
| mode 7 | 2 7 8 4 0 6 1 5 3 | |
| mode 8 | 2 8 3 0 7 4 1 6 5 | |

The information about the prediction modes may be efficiently coded by combining prediction mode information of two subblocks 38 in one codeword. The stream of bits includes then the resulting codewords, wherein each codeword represents the prediction modes of the two subblocks. Table 2 lists exemplary binary codewords for code numbers (Code No.) between 0 and 80. The probability of a mode of the first subblock is indicated as Prob0 and the probability of a mode of the second subblock is indicated as Prob1.

TABLE 2

| Code No. | Prob0 | Prob1 | Codeword |
|---|---|---|---|
| 0 | 0 | 0 | 1 |
| 1 | 0 | 1 | 001 |
| 2 | 1 | 0 | 011 |
| 3 | 1 | 1 | 00001 |
| 4 | 0 | 2 | 00011 |
| 5 | 2 | 0 | 01001 |
| 6 | 0 | 3 | 01011 |
| 7 | 3 | 0 | 0000001 |
| 8 | 1 | 2 | 0000011 |
| 9 | 2 | 1 | 0001001 |
| 10 | 0 | 4 | 0001011 |
| 11 | 4 | 0 | 0100001 |
| 12 | 3 | 1 | 0100011 |
| 13 | 1 | 3 | 0101001 |
| 14 | 0 | 5 | 0101011 |
| 15 | 5 | 0 | 000000001 |
| 16 | 2 | 2 | 000000011 |
| 17 | 1 | 4 | 000001001 |
| 18 | 4 | 1 | 000001011 |
| 19 | 0 | 6 | 000100001 |
| 20 | 3 | 2 | 000100011 |
| 21 | 1 | 5 | 000101001 |
| 22 | 2 | 3 | 000101011 |
| 23 | 5 | 1 | 010000001 |

TABLE 2-continued

| Code No. | Prob0 | Prob1 | Codeword |
|---|---|---|---|
| 24 | 6 | 0 | 010000011 |
| 25 | 0 | 7 | 010001001 |
| 26 | 4 | 2 | 010001011 |
| 27 | 2 | 4 | 010100001 |
| 28 | 3 | 3 | 010100011 |
| 29 | 6 | 1 | 010101001 |
| 30 | 1 | 6 | 010101011 |
| 31 | 7 | 0 | 00000000001 |
| 32 | 0 | 8 | 00000000011 |
| 33 | 5 | 2 | 00000001001 |
| 34 | 4 | 3 | 00000001011 |
| 35 | 2 | 5 | 00000100001 |
| 36 | 3 | 4 | 00000100011 |
| 37 | 1 | 7 | 00000101001 |
| 38 | 4 | 4 | 00000101011 |
| 39 | 7 | 1 | 00010000001 |
| 40 | 8 | 0 | 00010000011 |
| 41 | 6 | 2 | 00010001001 |
| 42 | 3 | 5 | 00010001011 |
| 43 | 5 | 3 | 00010100001 |
| 44 | 2 | 6 | 00010100011 |
| 45 | 1 | 8 | 00010101001 |
| 46 | 2 | 7 | 00010101011 |
| 47 | 7 | 2 | 01000000001 |
| 48 | 8 | 1 | 01000000011 |
| 49 | 5 | 4 | 01000001001 |
| 50 | 4 | 5 | 01000001011 |
| 51 | 3 | 6 | 01000100001 |
| 52 | 6 | 3 | 01000100011 |
| 53 | 8 | 2 | 01000101001 |
| 54 | 4 | 6 | 01000101011 |
| 55 | 5 | 5 | 01010000001 |
| 56 | 6 | 4 | 01010000011 |
| 57 | 2 | 8 | 01010001001 |
| 58 | 7 | 3 | 01010001011 |
| 59 | 3 | 7 | 01010100001 |
| 60 | 6 | 5 | 01010100011 |
| 61 | 5 | 6 | 01010101001 |
| 62 | 7 | 4 | 01010101011 |
| 63 | 4 | 7 | 0000000000001 |
| 64 | 8 | 3 | 0000000000011 |
| 65 | 3 | 8 | 0000000001001 |
| 66 | 7 | 5 | 0000000001011 |
| 67 | 8 | 4 | 0000000100001 |
| 68 | 5 | 7 | 0000000100011 |
| 69 | 4 | 8 | 0000000101001 |
| 70 | 6 | 6 | 0000000101011 |
| 71 | 7 | 6 | 0000010000001 |
| 72 | 5 | 8 | 0000010000011 |
| 73 | 8 | 5 | 0000010001001 |
| 74 | 6 | 7 | 0000010001011 |
| 75 | 8 | 6 | 0000010100001 |
| 76 | 7 | 7 | 0000010100011 |
| 77 | 6 | 8 | 0000010101001 |
| 78 | 8 | 7 | 0000010101011 |
| 79 | 7 | 8 | 0001000000001 |
| 80 | 8 | 8 | 0001000000011 |

With the nine prediction modes (Table 1) and the probabilities of the modes (Table 1, Table 2), a mode selection algorithm determines the mode according to which a particular subblock is predicted. In one embodiment of the present invention, the algorithm selects the mode using a sum of absolute differences (SAD) between the pixels a-p and the corresponding pixels in the original frame, and the above probabilities of the modes. The SAD and the probability table are used to select the mode for a particular subblock 38. The algorithm calculates a parameter uError for each of the nine possible modes Mode 0-8. The mode that provides the smallest uError is the mode selected for the subblock 38.

The uError is calculated as follows:

$$uError = SAD(\{a, \ldots, p\}, \{\text{original frame}\}) + rd\_quant[uMBQP] * uProb,$$

where SAD({a, ..., p},{original frame} is the sum of absolute difference between the pixels a-p and the corresponding pixels in the original frame, where rd_quant[uMBQP] is a table of constant values indexed by a quantization parameter uMBQP. uMBQP is given by const *U*8 *rd*_quant[32]={1,1,1,1,1,1,2,2,2,2,3,3,3,4,4,
5,5,6,7,7,8,9,11,12,13,15,17,19,21,24,27,30}; and where uProb is the probability of the mode occurring, provided by the position in the mode probability table (Table 1).

For example, the prediction mode for the subblocks A is the Mode 1 and the prediction mode for the subblock B is the Mode 1. The string "1 6 2 5 3 0 4 8 7" indicates that the Mode 1 is also the most probable mode for the subblock C. The Mode 6 is the second most probable mode, etc. Thus, when the algorithm calculates uError for the Mode 0, the probability uProb is 5. Further, for the Mode 1 the probability uProb is 0, for the Mode 2 the probability uProb is 2, for the Mode 3 the probability uProb is 4, and so forth.

In addition to coding the luminance portion (Y) of the video frame, the video system 1 of the present invention may also predict the chrominance portions (U, V) of the video frame. The chrominance portions may be considered as chrominance planes (U and V-planes). Typically, the chrominance planes (U and V-planes) are a quarter of the size of a luminance plane. Thus, in a 16×16 macroblock a corresponding 8×8 block of pixels exists in both the U and V-planes. These 8×8 blocks are divided into 4×4 blocks. In general, separate prediction modes are not transmitted for chrominace blocks. Instead, the modes transmitted for the Y-plane blocks are used as prediction modes for the U and V-plane blocks.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

The invention claimed is:

1. A method of decoding video data in a computing system, the method comprising:
   decoding a present subblock of a video frame according to an intra prediction mode that specifies a predicted value of an upper right-hand corner pixel of the present subblock based at least in part on a weighted average of a plurality of pixel values comprising a value of a lower right-hand corner pixel of a vertically adjacent subblock, a value of a lower left-hand corner pixel of an upper-right diagonally adjacent subblock, a value of a pixel immediately horizontally-right adjacent to the lower left-hand corner pixel of the upper-right diagonally adjacent subblock, a value of a lower right-hand corner pixel of a horizontally adjacent subblock, a value of an upper right-hand corner pixel of a lower-left diagonally adjacent subblock, and a value of a pixel immediately vertically-down adjacent to the upper right-hand corner pixel of the lower-left diagonally adjacent subblock.

2. The method of claim 1, wherein the intra prediction mode specifies the predicted value, P(d), of the upper right-hand corner pixel of the present subblock according to:

$$P(d)=(D+2E+F+L+2M+N+4)/8$$

wherein D comprises the value of the lower right-hand corner pixel of the vertically adjacent subblock, E comprises the value of the lower left-hand corner pixel of the upper-right diagonally adjacent subblock, F comprises the value of the pixel immediately horizontally-right adjacent to the lower left-hand corner pixel of the upper-right diagonally adjacent subblock, L comprises the value of the lower right-hand corner pixel of the horizontally adjacent subblock, M comprises the value of the upper right-hand corner pixel of the lower-left diagonally adjacent subblock, and N comprises the value of the pixel immediately vertically-down adjacent to the upper right-hand corner pixel of the lower-left diagonally adjacent subblock.

3. The method of claim 1, wherein each of the present subblock, the vertically adjacent subblock, the upper-right diagonally adjacent subblock, the horizontally adjacent subblock, and the lower-left diagonally adjacent subblock comprises a rectangular array of pixel locations.

4. The method of claim 1, wherein the intra prediction mode further specifies a predicted value of a pixel down-left diagonally from the upper right-hand corner pixel of the present subblock equal to the predicted value of the upper right-hand corner pixel of the present subblock.

5. The method of claim 1, wherein the intra prediction mode comprises a first diagonal prediction mode of a plurality of available intra prediction modes, wherein the plurality of available intra prediction modes further comprises a horizontal prediction mode and a vertical prediction mode.

6. The method of claim 5, wherein the plurality of available intra prediction modes further comprises five other diagonal prediction modes.

7. The method of claim 1, further comprising:
   receiving a compressed bitstream comprising compressed video frames defined by subblocks comprising the present subblock, the vertically adjacent subblock, the upper-right diagonally adjacent subblock, the horizontally adjacent subblock, and the lower-left diagonally adjacent subblock.

8. A non-transitory computer-readable medium including one or more instructions that, when executed by a machine, cause the machine to:
   decode a present subblock of a video frame according to an intra prediction mode that specifies a predicted value of an upper right-hand corner pixel of the present subblock based at least in part on a weighted average of a plurality of pixel values comprising a value of a lower right-hand corner pixel of a vertically adjacent subblock, a value of a lower left-hand corner pixel of an upper-right diagonally adjacent subblock, a value of a pixel immediately horizontally-right adjacent to the lower left-hand corner pixel of the upper-right diagonally adjacent subblock, a value of a lower right-hand corner pixel of a horizontally adjacent subblock, a value of an upper right-hand corner pixel of a lower-left diagonally adjacent subblock, and a value of a pixel immediately vertically-down adjacent to the upper right-hand corner pixel of the lower-left diagonally adjacent subblock.

9. The non-transitory computer-readable medium of claim 8, wherein the intra prediction mode specifies the predicted value, P(d), of the upper right-hand corner pixel of the present subblock according to:

$$P(d)=(D+2E+F+L+2M+N+4)/8$$

wherein D comprises the value of the lower right-hand corner pixel of the vertically adjacent subblock, E comprises the value of the lower left-hand corner pixel of the upper-right diagonally adjacent subblock, F comprises the value of the pixel immediately horizontally-right adjacent to the lower left-hand corner pixel of the upper-right diagonally adjacent subblock, L comprises the value of the lower right-hand corner pixel of the horizontally adjacent subblock, M comprises the value of the upper right-hand corner pixel of the lower-left diagonally adjacent subblock, and N comprises the value of the pixel immediately vertically-down adjacent to the upper right-hand corner pixel of the lower-left diagonally adjacent subblock.

10. The non-transitory computer-readable medium of claim 8, wherein each of the present subblock, the vertically adjacent subblock, the upper-right diagonally adjacent subblock, the horizontally adjacent subblock, and the lower-left diagonally adjacent subblock comprises a rectangular array of pixel locations.

11. The non-transitory computer-readable medium of claim 8, wherein the intra prediction mode further specifies a predicted value of a pixel down-left diagonally from the upper right-hand corner pixel of the present subblock equal to the predicted value of the upper right-hand corner pixel of the present subblock.

12. The non-transitory computer-readable medium of claim 8, wherein the intra prediction mode comprises a first diagonal prediction mode of a plurality of available intra prediction modes, wherein the plurality of available intra prediction modes further comprises a horizontal prediction mode and a vertical prediction mode.

13. The non-transitory computer-readable medium of claim 8, further comprising one or more instructions that, when executed by the machine, cause the machine to:
receive a compressed bitstream comprising compressed video frames defined by subblocks comprising the present subblock, the vertically adjacent subblock, the upper-right diagonally adjacent subblock, the horizontally adjacent subblock, and the lower-left diagonally adjacent subblock.

14. An apparatus, comprising:
circuitry to receive at least a portion of a bitstream of video data; and
circuitry to decode a present subblock of a video frame according to an intra prediction mode that specifies a predicted value of an upper right-hand corner pixel of the present subblock based at least in part on a weighted average of a plurality of pixel values comprising a value of a lower right-hand corner pixel of a vertically adjacent subblock, a value of a lower left-hand corner pixel of an upper-right diagonally adjacent subblock, a value of a pixel immediately horizontally-right adjacent to the lower left-hand corner pixel of the upper-right diagonally adjacent subblock, a value of a lower right-hand corner pixel of a horizontally adjacent subblock, a value of an upper right-hand corner pixel of a lower-left diagonally adjacent subblock, and a value of a pixel immediately vertically-down adjacent to the upper right-hand corner pixel of the lower-left diagonally adjacent subblock.

15. The apparatus of claim 14, wherein the intra prediction mode specifies the predicted value, P(d), of the upper right-hand corner pixel of the present subblock according to:

$$P(d)=(D+2E+F+L+2M+N+4)/8$$

wherein D comprises the value of the lower right-hand corner pixel of the vertically adjacent subblock, E comprises the value of the lower left-hand corner pixel of the upper-right diagonally adjacent subblock, F comprises the value of the pixel immediately horizontally-right adjacent to the lower left-hand corner pixel of the upper-right diagonally adjacent subblock, L comprises the value of the lower right-hand corner pixel of the horizontally adjacent subblock, M comprises the value of the upper right-hand corner pixel of the lower-left diagonally adjacent subblock, and N comprises the value of the pixel immediately vertically-down adjacent to the upper right-hand corner pixel of the lower-left diagonally adjacent subblock.

16. The apparatus of claim 14, wherein each of the present subblock, the vertically adjacent subblock, the upper-right diagonally adjacent subblock, the horizontally adjacent subblock, and the lower-left diagonally adjacent subblock comprises a rectangular array of pixel locations.

17. The apparatus of claim 14, wherein the intra prediction mode further specifies a predicted value of a pixel down-left diagonally from the upper right-hand corner pixel of the present subblock equal to the predicted value of the upper right-hand corner pixel of the present subblock.

18. The apparatus of claim 14, wherein the intra prediction mode comprises a first diagonal prediction mode of a plurality of available intra prediction modes, wherein the plurality of available intra prediction modes further comprises a horizontal prediction mode and a vertical prediction mode.

19. The apparatus of claim 18, wherein the plurality of available intra prediction modes further comprises five other diagonal prediction modes.

20. The apparatus of claim 14, further comprising a buffer to store the portion of the bitstream.

* * * * *